United States Patent
Brousard et al.

(10) Patent No.: US 10,782,385 B2
(45) Date of Patent: Sep. 22, 2020

(54) APPARATUS AND METHOD FOR HIGH ACCURACY DISTANCE AND ORIENTATION MEASUREMENT

(71) Applicant: Intel IP Corporation, Santa Clara, CA (US)

(72) Inventors: Noam S. Brousard, Tel Aviv (IL); Daniel Cohn, Raanana (IL); Tom Harel, Shfaim (IL)

(73) Assignee: Intel IP Corporation, Santa Clara, CA (US)

( * ) Notice: Subject to any disclaimer, the term of this patent is extended or adjusted under 35 U.S.C. 154(b) by 962 days.

(21) Appl. No.: 14/862,464

(22) Filed: Sep. 23, 2015

(65) Prior Publication Data

US 2017/0082724 A1    Mar. 23, 2017

(51) Int. Cl.
*G01S 5/02* (2010.01)
*H01Q 3/34* (2006.01)
(Continued)

(52) U.S. Cl.
CPC .............. *G01S 5/0252* (2013.01); *G01S 5/12* (2013.01); *G01S 11/02* (2013.01); *H01Q 3/34* (2013.01); *H01Q 3/42* (2013.01); *H01Q 21/28* (2013.01)

(58) Field of Classification Search
CPC . G01S 5/00; G01S 5/02; G01S 5/0242; G01S 5/0252; G01S 5/0284; G01S 5/0289; G01S 5/04; G01S 5/06; G01S 5/12; G01S 11/02; G01S 11/026; G01S 11/04; H01Q 3/34; H01Q 3/36; H01Q 3/40; H01Q 3/42; H01Q 21/28; H01Q 21/29; H04W 56/0065; H04W 64/00; H04W 64/003; H04W 64/006; H04W 74/00; H04W 74/08; H04W 74/0808; H04W 84/18; H04W 92/16; G08B 1/08; H04B 5/0025; H04B 5/0031; H04B 5/0043; H04B 7/04; H04B 7/0452
See application file for complete search history.

(56) References Cited

U.S. PATENT DOCUMENTS 8,421,631 B2    4/2013  Bloy et al.
9,320,957 B2 *  4/2016  Bentley .............. A63B 24/0006
(Continued)

FOREIGN PATENT DOCUMENTS

CN       101828307       9/2010
KR    1020130018235       2/2013

OTHER PUBLICATIONS

Segev, J. Next Generation Positioning Overview and Challenges. doc.: IEEE 11-14/1464r0 Nov. 2014.
(Continued)

*Primary Examiner* — Bernarr E Gregory
*Assistant Examiner* — Nuzhat Pervin
(74) *Attorney, Agent, or Firm* — Green, Howard & Mughal LLP

(57) ABSTRACT

Described is an machine-readable storage media having instruction stored thereon, that when executed, cause one or more processors to perform an operation comprising: sequentially transmit, in a first mode, at least two first probe request messages in at least two beam steering directions, respectively, towards a device; and receive, from the device, at least two first probe response messages in response to transmitting the at least two first probe request messages.

16 Claims, 8 Drawing Sheets

(51) Int. Cl.
    *G01S 11/02*     (2010.01)
    *H01Q 21/28*     (2006.01)
    *H01Q 3/42*     (2006.01)
    *G01S 5/12*     (2006.01)

(56) References Cited

U.S. PATENT DOCUMENTS

| | | | | |
|---|---|---|---|---|
| 9,961,701 | B2* | 5/2018 | Jain | H04W 74/0866 |
| 10,499,320 | B2* | 12/2019 | Abouelseoud | H04W 40/244 |
| 2007/0247368 | A1* | 10/2007 | Wu | G01S 5/06 |
| | | | | 342/465 |
| 2009/0023391 | A1* | 1/2009 | Falck | A61B 5/0024 |
| | | | | 455/41.2 |
| 2009/0054737 | A1* | 2/2009 | Magar | A61B 5/0205 |
| | | | | 600/300 |
| 2010/0225480 | A1* | 9/2010 | Bloy | G01S 5/0215 |
| | | | | 340/572.1 |
| 2010/0285807 | A1* | 11/2010 | Miller-Smith | H04W 36/30 |
| | | | | 455/437 |
| 2011/0199918 | A1* | 8/2011 | Sampath | H04W 8/005 |
| | | | | 370/252 |
| 2012/0063397 | A1* | 3/2012 | Abedi | H04W 74/00 |
| | | | | 370/329 |
| 2012/0220233 | A1* | 8/2012 | Teague | G01S 5/0289 |
| | | | | 455/41.2 |
| 2013/0044681 | A1* | 2/2013 | Abraham | H04W 52/262 |
| | | | | 370/328 |
| 2013/0148517 | A1* | 6/2013 | Abraham | H04W 52/04 |
| | | | | 370/252 |
| 2014/0009340 | A1* | 1/2014 | Meador | G01S 5/0284 |
| | | | | 342/458 |
| 2014/0045541 | A1* | 2/2014 | Moshfeghi | H04B 7/0456 |
| | | | | 455/500 |
| 2014/0064264 | A1* | 3/2014 | Morita | H04J 13/0014 |
| | | | | 370/350 |
| 2014/0204846 | A1* | 7/2014 | Maltsev | H04B 7/1555 |
| | | | | 370/329 |
| 2014/0253295 | A1* | 9/2014 | Roberts | H04W 4/023 |
| | | | | 340/10.5 |
| 2014/0285359 | A1* | 9/2014 | Hong | H04B 13/005 |
| | | | | 340/870.17 |
| 2014/0369275 | A1* | 12/2014 | Fleck | H04W 72/04 |
| | | | | 370/329 |
| 2015/0063190 | A1* | 3/2015 | Merlin | H04L 1/1887 |
| | | | | 370/312 |
| 2015/0131616 | A1* | 5/2015 | Jo | H04W 36/00835 |
| | | | | 370/331 |
| 2015/0156794 | A1* | 6/2015 | Kwon | H04W 72/1231 |
| | | | | 370/329 |
| 2016/0094957 | A1* | 3/2016 | Levy | H04W 4/08 |
| | | | | 455/518 |
| 2016/0095071 | A1* | 3/2016 | Henry | H04W 52/143 |
| | | | | 370/338 |
| 2016/0191120 | A1* | 6/2016 | Dobyns | H04B 5/0031 |
| | | | | 455/41.1 |
| 2016/0278126 | A1* | 9/2016 | Matsuo | H04W 74/02 |
| 2017/0070992 | A1* | 3/2017 | Matsuo | H04W 72/12 |
| 2017/0086211 | A1* | 3/2017 | Sahin | H04W 48/16 |
| 2017/0289329 | A1* | 10/2017 | Yim | G06F 3/048 |

OTHER PUBLICATIONS

International Preliminary Report on Patentability for International Patent Application No. PCT/US16/46102, dated Apr. 5, 2018.
International Search Report and Written Opinion for PCT/US16/46102 dated Nov. 15, 2016, 12 pages.
Office Action and Search Report notified May 18, 2020 for Taiwan Patent Application No. 105124792.
Office Action from Chinese Patent Application No. 201680048958.5 notified Jun. 3, 2020, 13 pgs.

\* cited by examiner

APPARATUS AND METHOD FOR HIGH ACCURACY DISTANCE AND ORIENTATION MEASUREMENT

BACKGROUND

In various sensor applications, such as virtual reality (VR) applications, it is generally accepted that a whole external infrastructure exists to support an application to monitor position or distance between different objects. In such VR applications, there is no constraint on the extra burden the equipment imposes on the subjects. As such, in VR applications, a user may typically be engulfed in heavy equipment and be monitored by other, off-body devices.

As demand for smaller light weight form factors increases, traditional schemes for accurately measuring distance and orientation of a device relative to another device (e.g., within a few centimeters) cannot be used because traditional schemes are heavy, bulky, expensive, not accurate, slow (i.e., have high latency), and not scalable to smaller form factors.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
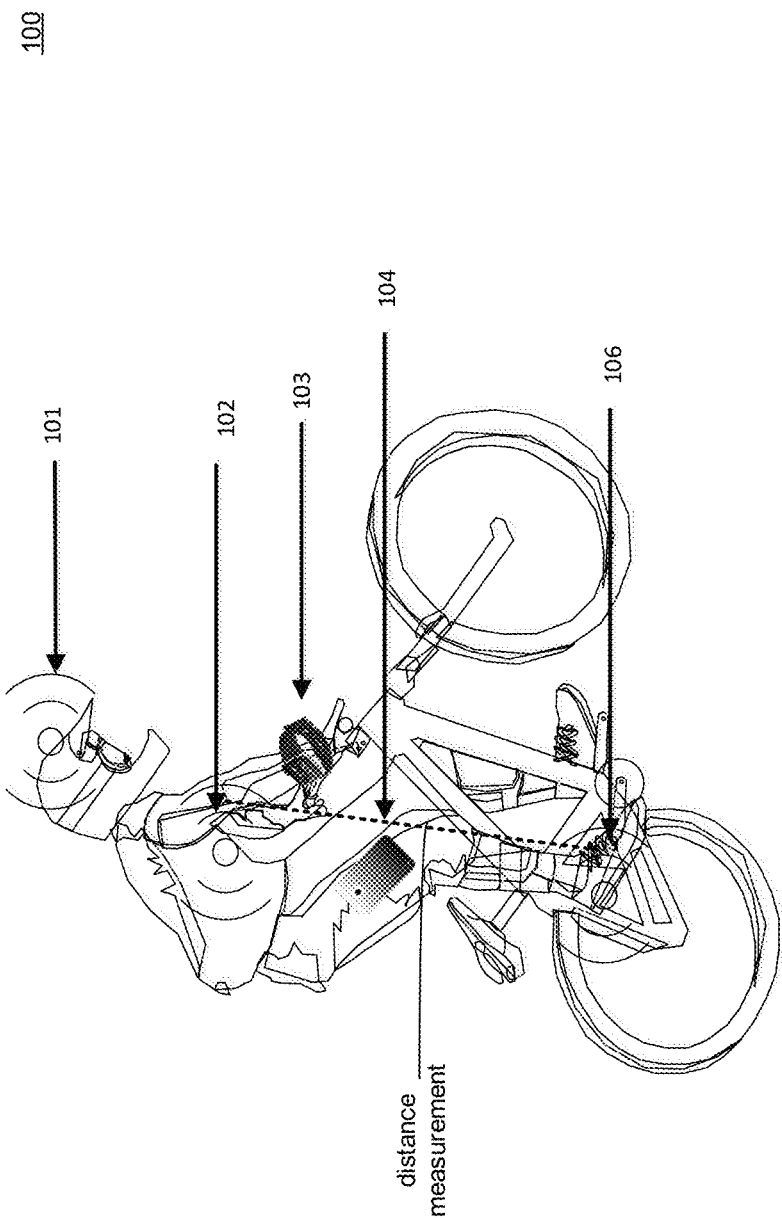
FIG. 1 illustrates an ensemble of wearable devices including one or more sensor nodes having an apparatus for high accuracy distance and orientation measurement, according to some embodiments of the disclosure.

Constantly measuring and monitoring relative position or distance and orientation between different objects (e.g., body parts, moving objects, etc.) while maintaining high accuracy is challenging. Multiple applications emerging today may greatly benefit from high accuracy and high frequency relative position and orientation measurements between multiple objects within a predefined group. For example, virtual reality applications (such as gaming or other) could use such capabilities to enable interactive responses to different relative motions between arms, legs, etc. Interactions with smart homes may be greatly enhanced if a variety of motions and gestures are used with a person's arms, such that each gesture is differentiated from the other by the slightest relative movements of the arms.

Another example where accurate distance and orientation measurement may be useful is a Body Sensor Network (BSN). BSN is a wireless network of wearable computing devices. BSN devices may be embedded inside the body as implants or may be surface-mounted on the body in a fixed position. BSN may also include devices which humans can carry in different positions. For example, devices that can be carried in clothes, pockets, by hand, or in various bags can be part of BSN. A BSN can be employed for sports real time training monitoring and feedback. In this example, an athlete using BSN expects immediate and accurate real-time feedback about her movements, and in particular about the relative position of different body parts, so that she may perfect the athletic movement. Two such examples are illustrated with reference to FIGS. 2-3.

Some solutions to monitor distance between two objects include a whole external infrastructure to support the applications. Examples of such external infrastructure include sports-training institutions, sports labs, and virtual reality rooms. In such solutions, a user may typically be engulfed in heavy equipment and be monitored by other, off-body devices. For on-body, inter-object ranging (i.e., inter-object distance and orientation measurement), there have been multiple ongoing attempts to adapt current wireless technologies (e.g., WiFi) to provide accurate ranging capabilities (i.e., distance measuring capabilities). But, these attempts have several drawbacks.

WiFi standards are driving towards providing a high accuracy peer-to-peer ranging method (i.e., distance measuring method). Wi-Fi (or WiFi) is a local area wireless computer networking technology that allows electronic devices to network, mainly using the 2.4 gigahertz (12 cm) Ultra High Frequency (UHF) and 5 gigahertz (6 cm) Super High Frequency (SHF) Industrial Scientific and Medical (ISM) radio bands. The Wi-Fi Alliance® defines Wi-Fi as any "wireless local area network" (WLAN) product based on the Institute of Electrical and Electronics Engineers' (IEEE) 802.11 standards." In the "WiFi Aware" initiative, also known as Neighbor Area Network (NAN), a WiFi transceiver uses Time-of-Flight (TOF) to calculate its distance from another user device. At a sampling rate of 80 MHz, using straightforward algorithms, an accuracy of approximately 3 meters can be achieved using the WiFi Aware technology. These algorithms for WiFi Aware, however, are not suited for determining and monitoring changes to shorter distances (e.g., within centimeters or less).

Ultrasound (ULS) provides another way of measuring or monitoring distances between two objects. ULS based algorithms can achieve high accuracy but ULS needs line-of-sight between two objects. This severely compromises the usability of such ULS sensors in the applications mentioned here, where, for example, two sensors may be strapped to two arms, each on different sides of a person's body, without line of sight.

Visible Light Communication (VLC) using smart LEDs (Light Emitting Diodes) provides another technique for measuring or monitoring distances between two objects. However, such techniques can attain approximately 1 meter of accuracy and need line-of-sight as well, which make it even less suitable than ULS for these applications.

Global Navigation Satellite System (GNSS) provides another technique for measuring or monitoring distances between two objects. GNSS is a space-based satellite navigation system that provides $\{x, y, z\}$ location and time information anywhere on or near the earth where there is an unobstructed line-of-sight to four or more GNSS satellites. It can provide location with accuracy of a few meters, but not centimeters.

In addition, GNSS depends on inputs from satellites, and may not work in indoor applications. Furthermore, even for outdoors, there are conditions in which GNSS does not perform well enough (e.g., deep urban canyon settings where multiple reflections from buildings can skew results). The satellite communication adds latency and so the responsiveness of GNSS is slow (e.g., much larger than 100s of milliseconds). Since GNSS is an absolute positioning method (i.e., it returns the absolute location on earth), it needs to be updated with satellite location information which requires downloading the ephemeris (i.e., the precise orbit for the satellite) and almanac (i.e., coarse orbit and status information for up to 32 satellites in the constellation). These download times entail long start up and refresh times when coming out of a low power mode.

Even though each transceiver in the GNSS learns its position independently, for two objects to infer their relative position, there still needs to be an accurate and low latency exchange of position information between them. As such, GNSS does not provide low latency (e.g., less than 100s of milliseconds) response for position and time reporting between objects. Also, even if GNSS may be embedded in smartphones, tablets, or laptops, motor vehicles, etc., it is still too large, power hungry, and expensive to be integrated in smaller form factors such as minimalistic wearables.

Radar provides another technique for measuring or monitoring distances between two objects (i.e., ranging between two objects). Radar is an object-detection system that uses radio waves to determine the range, altitude, direction, or speed of objects. It is commonly used to detect aircraft, ships, spacecraft, guided missiles, and motor vehicles. The radar antenna transmits pulses of radio waves or microwaves that bounce off any object in their path. It uses TOF to obtain a distance measurement (i.e., transmit a short pulse of radio signal and measure the time it takes for the reflection to return). The distance is one-half the product of the Round Trip Time (RTT) and the speed of the signal. Radar can make almost instant speed measurements by using the Doppler effect.

However, radar indiscriminately identifies position and relative speed of any object in the path of the transmitted radio wave pulses. With reference to the example where distances are to be measured between two body parts of a person, a radar would get a mapping of every body part, surrounding object, and the background. As such, a high power processor may be needed to analyze the collected data and to filter out the background and uninteresting body parts. Also, most radar implementations are of dimensions that are large and not suitable for wearable form factors.

Various embodiments described here address the drawbacks of traditional schemes (e.g., VLC, ULS, GNSS, Radar, etc.) for measuring distance and orientation by constantly monitoring the relative position and orientation between different objects (e.g., body parts) while maintaining high accuracy. Some embodiments describe a scheme (i.e., method, apparatus, and/or system) to accurately measure the distance between two objects and their relative orientation to each other.

In some embodiments, the attainable accuracy achieved from the scheme is in the order of centimeters or less. In some embodiments, the measurements performed by the scheme can be done at a very high rate on the order of every 10s of milliseconds. This allows, for example, an athlete to monitor her relative arm positioning and orientation at frequent time intervals in order to compare to best known practices and apply corrective actions if necessary. As such, the athlete can track every single phase of the movement so that the monitored movements may be analyzed at all key points in time.

Some embodiments are based on measuring signal TOF in a high-bandwidth and high-frequency wireless technology to obtain the required position accuracy. As such, various embodiments provide a cost effective solution to attain this goal. In some embodiments, each sensor is implemented as a transceiver with a beamforming antenna array. In some embodiments, the beamforming antenna array is designed to cover an angular range and angular resolution required for the particular application.

Some embodiments provide an apparatus and method which can constantly monitor the relative position and orientation between different objects while maintaining high accuracy (e.g., accurate to the degree of few centimeters, so that subtle differences in gesture and motion may be observed). In some embodiments, the scheme for measuring the distance between two objects does not require line-of-sight between the objects. In some embodiments, measurements are frequently made by the apparatus so that the monitored movements may be analyzed at all key points in time.

In some embodiments, the sensor(s) (which includes the apparatus to measure the distance and orientation between two objects) is located on the monitored objects only, without the need for additional external equipment. As such, the apparatus (or sensors) of the various embodiments can be placed in a variety of locations and are not limited to equipment rich venues (e.g. labs, arcades, etc.). In some embodiments, the form factor of such hardware allows for attaching the apparatus to the monitored object (e.g., wearing it) without significantly burdening the object from its intended motion. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% (unless otherwise specified) of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure.

FIG. 1 illustrates ensemble 100 of wearable devices including one or more sensor nodes having an apparatus for high accuracy distance and orientation measurement, according to some embodiments of the disclosure. In this example, ensemble 100 is on a person and his/her ride (here, a bicycle). However, the embodiments are not limited to such. Other scenarios of wearable devices and their usage may work with various embodiments.

For example, in some embodiments, sensor nodes can be embedded into some other products (e.g., walls in a house, vehicles, clothes, body of a person, etc.) and can be controlled using a controller, gateway device, or computing device. The sensor node(s) of some embodiments can also be part of a wearable device. The term "wearable device" (or wearable computing device) generally refers to a device coupled to a person. For example, devices (such as sensors, cameras, speakers, microphones (mic), smartphones, smart watches, etc.) which are directly attached on a person or on the person's clothing are within the scope of wearable devices.

In some examples, wearable computing devices may be powered by a main power supply such as an AC/DC power outlet. In some examples, wearable computing devices may be powered by a battery. In some examples, wearable computing devices may be powered by a specialized external source based on Near Field Communication (NFC). The specialized external source may provide an electromagnetic field that may be harvested by circuitry at the wearable computing device. Another way to power the wearable computing device is electromagnetic field associated with wireless communication, for example, WLAN transmissions. WLAN transmissions use far field radio communications that have a far greater range to power a wearable computing device than NFC transmission. WLAN transmissions are commonly used for wireless communications with most types of terminal computing devices.

For example, the WLAN transmissions may be used in accordance with one or more WLAN standards based on Carrier Sense Multiple Access with Collision Detection (CSMA/CD) such as those promulgated by the Institute of Electrical Engineers (IEEE). These WLAN standards may be based on CSMA/CD wireless technologies such as Wi-Fi™ and may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

Continuing with the example of FIG. 1, ensemble 100 of wearable devices includes device 101 (e.g., camera, microphone, etc.) on a helmet, device 102 (e.g., blood pressure sensor, etc.) on the person's arm, device 103 (e.g., a smart watch that can function as a terminal controller or a device to be controlled), device 104 (e.g., a smart phone and/or tablet in a pocket of the person's clothing), and device 106 (e.g., an accelerometer to measure paddling speed). In some embodiments, ensemble 100 of wearable devices has the capability to communicate by wireless energy harvesting mechanisms or other types of wireless transmission mechanisms.

In some embodiments, devices 102 (on a person's arm) and 106 (on a person's foot) comprise sensor nodes with apparatus for high accuracy distance and orientation measurement between the two devices. In some embodiments, each device 102/106 is implemented as a transceiver with a beamforming antenna array. In some embodiments, the beamforming antenna array is designed to cover the angular range and angular resolution required for the particular application.

In some embodiments, device 102 and device 106 measure a physical distance by identifying the direct path between the two devices. In some embodiments, beamforming technology is employed by devices 102 and 106 which allow the devices to identify a beam steering direction where the direct path is received, by selecting a beam steering direction with the earliest Time-of-Arrival. The transmission/reception direction of a beamforming antenna array is steered by applying different phases to the signal fed to each array element. By doing this, the array is effectively "pointed" at different directions. This effectively provides information on the direction from which the direct path is received, thus deriving the relative angle between two transceivers of the two devices 102/106. Here, the angle is relative to a reference that is fixed in the device frame of reference, e.g., relative to a line perpendicular to the device screen.

Distance accuracy in TOF measurements may depend on the signal bandwidth and Signal-to-Noise Ratio (SNR). In some embodiments, technologies such as WiGig, which operates at 60 GHz and uses a 2160 MHz bandwidth, are used by devices 102/106. The WiGig specification (e.g., Version 1.1 Released June 2011) allows devices to communicate without wires at multi-gigabit speeds. It enables high performance wireless data, display, and audio applications that supplement the capabilities of previous wireless LAN (Local Area Network) devices.

The symbol rate for WiGig is 1760 Msymbols/sec, which allows for a distance resolution of approximately 20 cm, which is about 10× better than the resolution achievable by WiFi technology with 160 MHz channel bandwidth. In some embodiments, the distance resolution for WiGig can be further perfected (i.e., made finer or smaller than 20 cm) by using a filtering technique (e.g., Kalman filtering). In other embodiments, other high frequency wireless technologies may be used by devices 102/106 to measure distance and orientation between the devices. For example, IEEE 802.11ad compliant transceivers can be engineered and used by devices 102/106 to measure accurate distance and orientation between the devices.

Each transceiver of each device 102/106 alternates between sweep and Omni periods, in accordance with some embodiments. In some embodiments, in the sweep period, probe requests are transmitted by the device in sweep mode for various transmission phases (i.e., phase inputs to the array of antennas). For example, probe requests are transmitted by the device in sweep mode in various beam steering directions. In some embodiments, in the Omni period, probe responses are detected by the array of antennas in the Omni mode. In this mode, the array of antennas are configured to perform as an Omni antenna. In some embodiments, a dedicated Omni antenna is used during Omni mode instead of configuring the array of antennas in Omni direction. As such, the array of antennas and the Omni antenna are separate antennas in the respective devices in accordance with some embodiments.

In some embodiments, devices 102/106 allocate and coordinate period times between each other such that one transceiver of one device is in sweep mode while the other transceiver of the other device is in Omni mode. In some embodiments, when there are multiple pairs of devices, and coordinating period times between the pairs may be difficult, frequency separation can be used for multiple pairs of devices to operate sweep/Omni periods. For example, one pair of devices operates in sweep and Omni modes at frequency f1 while another pair of devices operates in sweep and Omni modes at frequency f2, where frequency f2 is different or separate from frequency f1.

The roles of sweep mode and Omni mode are swapped, in accordance with some embodiments. For example, the device which was first in sweep mode now enters the Omni mode, while the other device which was in Omni mode now enters the sweep mode. In some embodiments, after the sweep and Omni periods finish in both directions, each transceiver of each device builds a vector of data indicating signal strength and distance versus relative angle. Here, the relative angle is derived from the beam steering direction in which the message was received. In some embodiments, the data associated with the vector that provides the shortest distance and highest signal strength is identified as the data which determines the accurate measurement of the distance between the two devices 102/106.

Figure 2:
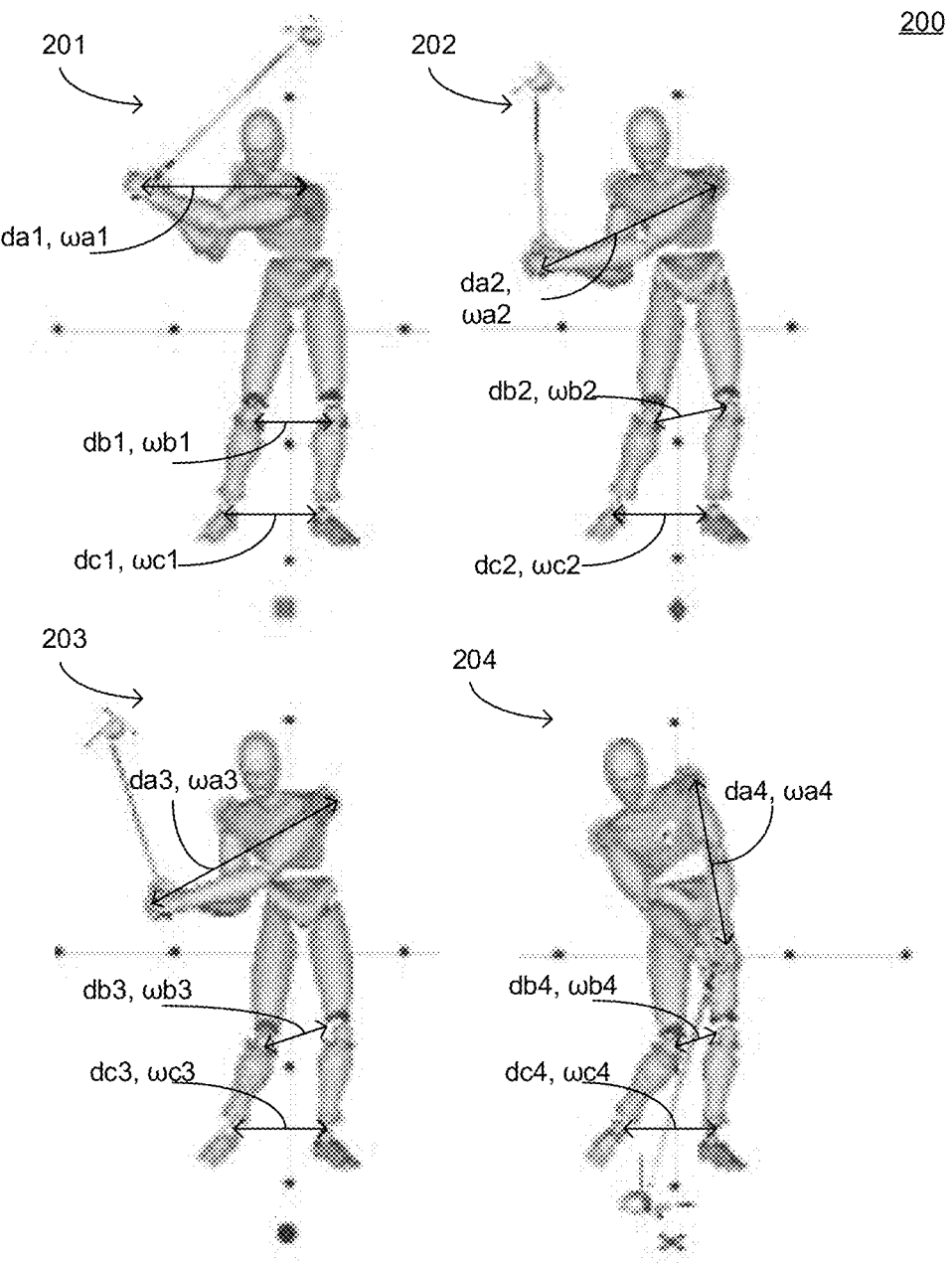
FIG. 2 illustrates snap shots of a golf player having sensor nodes, with apparatus for high accuracy distance and orientation measurement, to measure various postures of the player as the player gets ready to hit the ball and then hits it, in accordance with some embodiments of the disclosure.

FIG. 2 illustrates snap shots 200 of a golf player having sensor nodes, with apparatus for high accuracy distance and orientation measurement, to measure various postures of the player as the player gets ready to hit the ball and then hits it, in accordance with some embodiments of the disclosure. Here, four snap shots—201, 202, 203, and 204—are shown. In each snap shot, distance 'd' and relative angle 'ω' is measured between two devices strapped to the golf player.

Here, the device pairs are attached at various positions along the body of the player. In this example, a first device pair is located on the shoulder and wrist, a second device pair is located on the two knees, and a third device pair is located at the two angles of the player. Using the various embodiments for accurately measuring distance 'd' and relative angle 'ω', da1 and ωa1; da2 and ωa2; da3 and ωa3; and da4 and ωa4 are measured for the first device pair over the four motion snap shots—201, 202, 203, and 204, respectively. In some embodiments, db1 and ωb1; db2 and ωb2; db3 and ωb3; and db4 and ωb4 are measured for the second device pair over the four motion snap shots—201, 202, 203, and 204, respectively. In some embodiments, dc1 and ωc1; dc2 and ωc2; dc3 and ωc3; and dc4 and ωc4 are measured for the third device pair over the four motion snap shots—201, 202, 203, and 204, respectively.

In some embodiments, a smart device or computing terminal such as smart device 2100 of FIG. 9 can be used to analyze the distance and relative angle measurements for the various device pairs to gauge the performance of the player hitting the ball. The data can be used to help the player find the effective posture to hit the golf ball for the longest distance.

Figure 3:
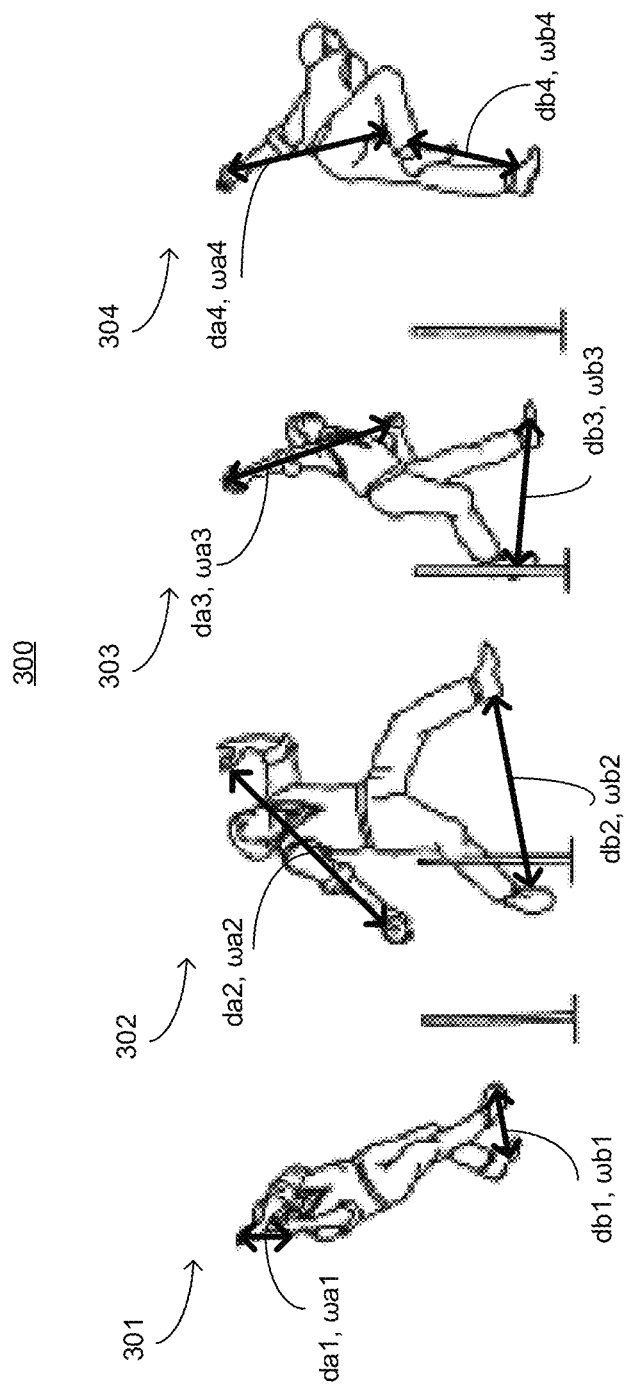
FIG. 3 illustrates snap shots of a cricket bowler having sensor nodes, with apparatus for high accuracy distance and orientation measurement, to measure various postures of the cricket bowler as the bowler bowls, in accordance with some embodiments of the disclosure.

FIG. 3 illustrates snap shots 300 of a cricket bowler having sensor nodes, with apparatus for high accuracy distance and orientation measurement, to measure various postures of the cricket bowler as the bowler bowls, in accordance with some embodiments of the disclosure. FIG. 3 provides another example in which various embodiments are used to determine a player's motion for another sport.

Here, four snap shots—301, 302, 303, and 304—are shown. In each snap shot, distance 'd' and relative angle 'ω' are measured between two devices. The devices pairs are attached at various positions along the body of the cricket bowler. In this example, a first device pair is located on the two wrists, and a second device pair is located on the two ankles of the cricket bowler.

Using the various embodiments for accurately measuring distance and relative angle, da1 and ωa1; da2 and ωa2; da3 and ωa3; and da4 and ωa4 are measured for the first device pair over the four motion snap shots—301, 302, 303, and 304, respectively. In some embodiments, db1 and ωb1; db2 and ωb2; db3 and ωb3; and db4 and ωb4 are measured for the second device pair over the four motion snap shots—301, 302, 303, and 304, respectively. In some embodiments, the communication between the devices of the first pair and the second pair are on different frequencies. For example, the first device pair operates on frequency f1 while the second device pair operates on frequency f2. As such, data between the pair of devices is not corrupted.

In some embodiments, a smart device or computing terminal such as smart device 2100 of FIG. 9 can be used to analyze the distance and relative angle measurement to gauge the performance of the bowler while bowling. The data can be used to help the bowler find the perfect running rhythm and wrist angle to release the ball to achieve the right ball bounce and pace.

Figure 4:
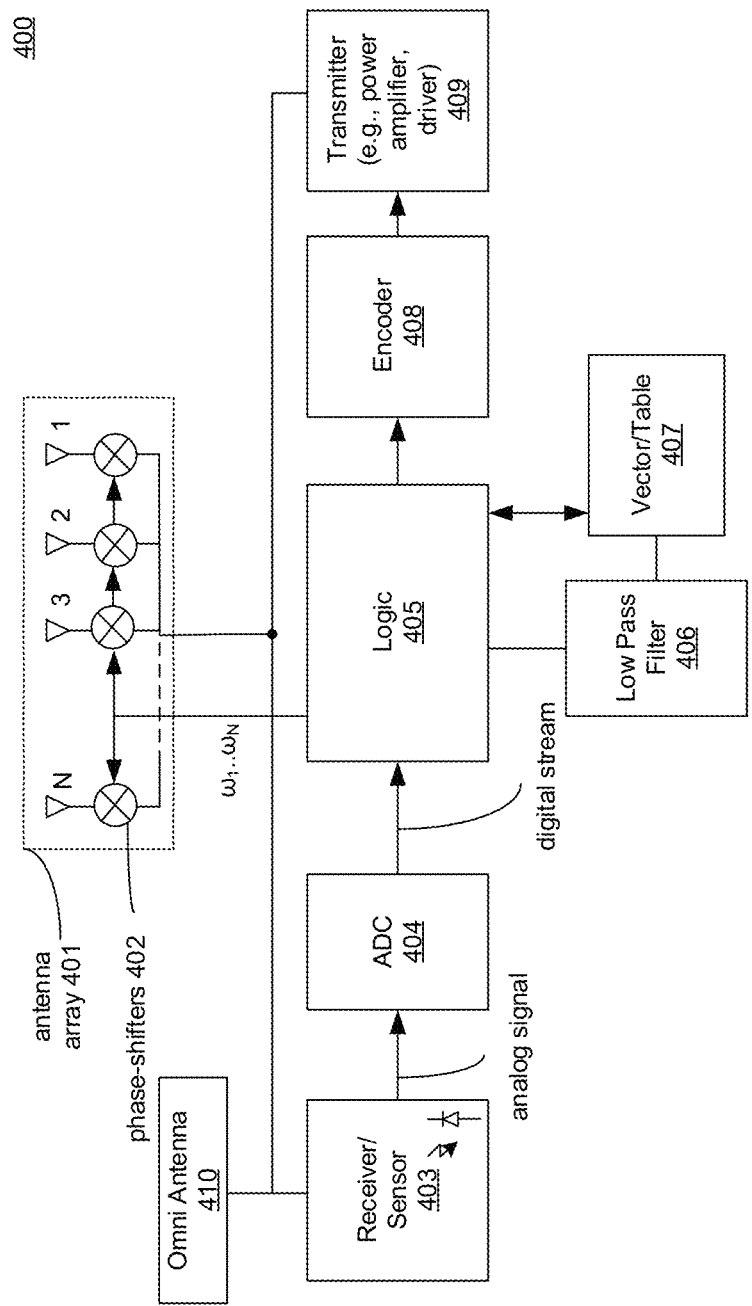
FIG. 4 illustrates an apparatus for high accuracy distance and orientation measurement, in accordance with some embodiments of the disclosure.

FIG. 4 illustrates apparatus 400 for high accuracy distance and orientation measurement, in accordance with some embodiments of the disclosure. It is pointed out that those elements of FIG. 4 having the same reference numbers (or names) as the elements of any other figure can operate or function in any manner similar to that described, but are not limited to such. In some embodiments, apparatus 400 comprises antenna array 401, phase-shifters 402, Receiver/Sensor 403, analog-to-digital converter (ADC) 404, Logic 405, Low Pass Filter 406, Vector/Table 407, Encoder 408, and Transmitter 409. In some embodiments, apparatus 400 includes Omni Antenna 410 to operate in Omni mode.

In some embodiments, antenna array 401 may comprise one or more of directional or omnidirectional antennas 1 through 'N,' where 'N' is an integer, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, antenna array 401 are separated to take advantage of spatial diversity. In some embodiments, Omni Antenna 410 may comprise one or more omnidirectional antennas 1 through 'N,' where 'N' is an integer, including monopole antennas, dipole antennas, loop antennas, patch antennas, microstrip antennas, coplanar wave antennas, or other types of antennas suitable for transmission of RF signals. In some MIMO embodiments, Omni Antenna 410 may have antennas that are separated to take advantage of spatial diversity.

In some embodiments, phase-shifters 402 are provided to tune the phase of the receiving/transmitting signal. For example, each antenna of antenna array 401 may be coupled to a corresponding phase-shifter, such that phase-shifter 402 coupled to antenna 1 receives phase input $\omega_1$, phase-shifter 402 coupled to antenna 2 receives phase input $\omega_2$, and so on. Any known phase-shifter may be used for phase-shifters 402.

In some embodiments, Receiver/Sensor 403 detects the received signal and amplifies it to generate an analog signal. An analog signal is any continuous signal for which the time varying feature (variable) of the signal is a representation of some other time varying quantity (i.e., analogous to another time varying signal). In some embodiments, Receiver/Sensor 403 comprises a Low Noise Amplifier (LNA). In some embodiments, Receiver/Sensor 403 includes a sensor to measure a certain attribute of a bodily function (e.g., pulse rate). The output of Receiver/Sensor 403 is an analog signal. Depending on the application, Receiver/Sensor 403 may sense different attributes. For example, Receiver/Sensor 403 may be placed on a building to sense any earthquake.

In some embodiments, the analog signal is converted into a digital stream by ADC 404. A digital signal or stream is a physical signal that is a representation of a sequence of discrete values (i.e., a quantified discrete-time signal), for example of an arbitrary bit stream. Any suitable ADC may be used to implement ADC 404. For example, ADC 404 is one of: direct-conversion ADC (for flash ADC), successive-approximation ADC, ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC.

In some embodiments, the digital stream is received by Logic 405 and processed. In some embodiments, Logic 405 (e.g., a Finite State Machine) is operable to switch the functioning mode of apparatus 400 to one of Sweep mode or Omni mode. In some embodiments, Logic 405 coordinates with another device the sweep and Omni periods. As such, Logic 405 is aware relative to the other device when to be in Sweep mode and when to be in Omni mode. In some embodiments, after establishing the roles of the two devices (i.e., whether to be in Sweep mode or Omni mode, and their respective periods), Logic 405 begins the process of gathering data to determine the distance and orientation of apparatus 400 relative to the other device. In some embodiments, when there are multiple pairs of devices, and coordinating period times between the devices may be difficult, frequency separation can be used by Logic 405 for multiple pair of devices to operate Sweep/Omni periods.

In some embodiments, during Sweep mode, Logic 405 instructs Transmitter 409 to transmit a probe request message via antenna array 401 in each array direction (i.e., in each beam steering direction). In some embodiments, the array direction (and hence the beam steering direction) is changed on every attempt of transmitting probe request message. For example, the array direction is modified by changing the phase input '$\omega$' to antenna array 401.

In some embodiments, each probe request message includes an encoding of the array direction. In some embodiments, this encoding of the array direction is performed by Encoder 408. Any known encoding scheme can be used for encoding the array direction. For example, each array direction for beam steering may be assigned a number and that number is encoded in the probe request message with the same modulation and coding scheme used by the underlying wireless technology (e.g., WiGig/802.11ad).

In some embodiments, the start time (Tst) of transmitting the probe request message is recorded in Vector/Table 407 by Logic 405. In some embodiments, the physical angle of the beam steering direction in use is recorded in Vector/Table 407 by Logic 405. For example, azimuth and elevation angles (for representing a three dimensional angle) associated with the probe request message are recorded in Vector/Table 407 by Logic 405 with respect to a fixed reference. In some embodiments, Vector/Table 407 is stored in a non-volatile memory (e.g., NAND flash memory). One such embodiment of Vector/Table 407 is illustrated with reference to FIG. 6.

Referring back to FIG. 4, in some embodiments, when a probe request message is received by the other device, the other device decodes the probe request message and sends a probe response message including probe request reception time (Tor) and probe response transmission time (Tot). In some embodiments, Receiver/Sensor 403 receives the Tor and Tot of each probe response message, and Logic 405 stores that data in Vector/Table 407. In some embodiments, this data in Vector/Table 407 is correctly associated with the start time Tst of the probe request message (that resulted in the corresponding probe response message). In some embodiments, signal strength of the received signal (i.e., of the probe response message) is also calculated (by any known methods) and stored in Vector/Table 407. As such, for each probe request message sent and probe response message received, Logic 405 populates Vector/Table 407 with data such as: physical angle(s), Tst, Tor, Tot, signal strength, time-of-flight (TOF), etc.

In some embodiments, after Sweep mode completes (e.g., after sending probe request messages sequentially for every phase angle or every beam steering direction), Logic 405 transitions apparatus 400 to Omni mode. In this case, the other device communicating with apparatus 400 switches from Omni mode to Sweep mode. In some embodiments, when Logic 405 enters Omni mode, Logic 405 instructs antenna array 401 to operate in the Omni-direction. In some embodiments, Logic 405 instructs antenna array 401 and Receiver/Sensor 403 to listen for probe request messages sent from the other device.

In some embodiments, Omni Antenna 410 is provided for use during Omni mode. In some embodiments, when Logic 405 enters Omni mode, Logic 405 begins to receive data from Omni Antenna 410 which operates in the Omni-direction. In some embodiments, Logic 405 instructs Receiver/Sensor 403 to listen for probe request messages sent from the other device using Omni Antenna 410. In one such embodiment, the other device is operating in Sweep mode and is transmitting probe request messages to apparatus 400 so that the other device can determine its distance and orientation relative to apparatus 400.

In some embodiments, after Receiver/Sensor 403 receives the probe request message, Logic 405 calculates the signal strength for the messages. It also responds to each correctly decoded probe request message with a probe response message including probe request reception time and probe response transmission time. In some embodiments, during the time Receiver/Sensor 403 receives probe response messages, Logic 405 in the sweep period calculates the TOF for the probe messages, and uses this time to calculate the distance traveled by the signal.

Due to signal multipath reflection and diffraction, the probe signal transmitted by the other transceiver is likely to be correctly decoded in multiple array directions of antenna array 401, in accordance with some embodiments. To correctly derive the relative angle between the specific transceiver pairs (i.e., apparatus 400 and the other device), angles with longer propagation distances are identified from Vector/Table 407 as multipath reflections and therefore identified as not relevant for relative angle and distance determination. From the remaining relative angles in Vector/Table 407, the one with the strongest signal strength is determined by Logic 405 to represent the accurate relative angle and distance between the transceiver pair.

In some embodiments, Logic 405 repeats the above procedure periodically to track changes in distance and relative angle. In some embodiments, the period of repeating the Sweep and Omni modes is selected by Logic 405 such that the maximum expected location change between the two procedures or modes is lower than the required accuracy. For example, if the maximum angular speed expected in the application is 100°/sec, and a resolution of 2° is required, the period is set to be at the most 20 msec.

In some embodiments, the end result of the process (i.e., distance and relative angle), is stored as a function of time. For example, apparatus 400 may display distance readings (e.g., 23 cm, 24 cm, 89 cm, 22 cm) at predefined or programmable intervals (e.g., 100 ms intervals). An algorithm (e.g., a low pass filter) may notice that the larger distance (89 cm in this example) is an outlier and so an error. This outlier data is discarded and replaced by an interpolation of the neighboring samples, in accordance with some embodiments.

In some embodiments, the results are processed by Low Pass Filter (LPF) 406 to discard spurious changes in measured distance and relative angle that are not related to physical changes in transceiver location. In some embodiments, the cutoff frequency of LPF 406 is calibrated according to the expected physical transceiver velocity. For example, the cutoff frequency of LPF 406 is calibrated to be such that changes above 50 KHz are discarded (this may be relevant when the period is set to a value lower than 20 msec).

Transmitter 409 may use any known high frequency transmitting scheme. In some embodiments, to minimize propagation diffraction impact on the relative angle calculation, high frequency transceivers are used. In some embodiments, Transmitter 409 is compliant with WiGig transmission standard (i.e., IEEE 802.11 ad transmitting standard). The high frequency transmission capability also enables building antenna arrays with total side of a few centimeters, and yet with fine angular resolution, in accordance with some embodiments.

In some embodiments, Transmitter 409 uses WLAN transmissions in accordance with one or more WLAN standards based on CSMA/CD such as those promulgated by the IEEE. In some embodiments, Transmitter 409 may use Long Term Evolution (LTE) compliant transmission mechanisms.

Any suitable low power transmitter may be used for implementing Transmitter 409 (e.g., a transmitter having low power amplifier driver). In some embodiments, Transmitter 409 converts the encoded probe request and/or probe response messages to an analog radio frequency (RF) signal which is then transmitted by antenna array 401 to the other device. In other embodiments, other forms of wireless transmissions may be used by Transmitter 409.

In some embodiments, Transmitter 409 includes a digital-to-analog converter (DAC) (not shown) to convert the encoded probe request and/or probe response messages into analog signal for transmission. In some embodiments, the DAC is a pulse-width modulator (PWM). In some embodiments, the DAC is an oversampling DAC or interpolating DAC such as sigma-delta DAC. In other embodiments, other types of DACs may be used. For example, the DAC of Transmitter 409 is one of switched resistor DAC, switched current source DAC, switched capacitor DAC, R-2R binary weighted DAC, Successive-Approximation or Cyclic DAC, thermometer-coded DAC, etc. The output the DAC is an analog signal which is amplified and then transmitted to antenna array 401 to the other device(s), according to some embodiments.

In applications that use multiple sensor pairs, each sensor pair can be configured to operate in different frequency channels to allow simultaneous operation, in accordance with some embodiments. Alternatively, in some embodiments, time-sharing can be coordinated between the sensor pairs operating in the same frequency channel. In applications that use relative positioning between more than two sensors, the process of Sweep and Omni modes can be repeated between each pair in the sensor group, in accordance with some embodiments. As such, Sweep and Omni periods are coordinated for every pair in the group, in accordance with some embodiments.

Figure 5:
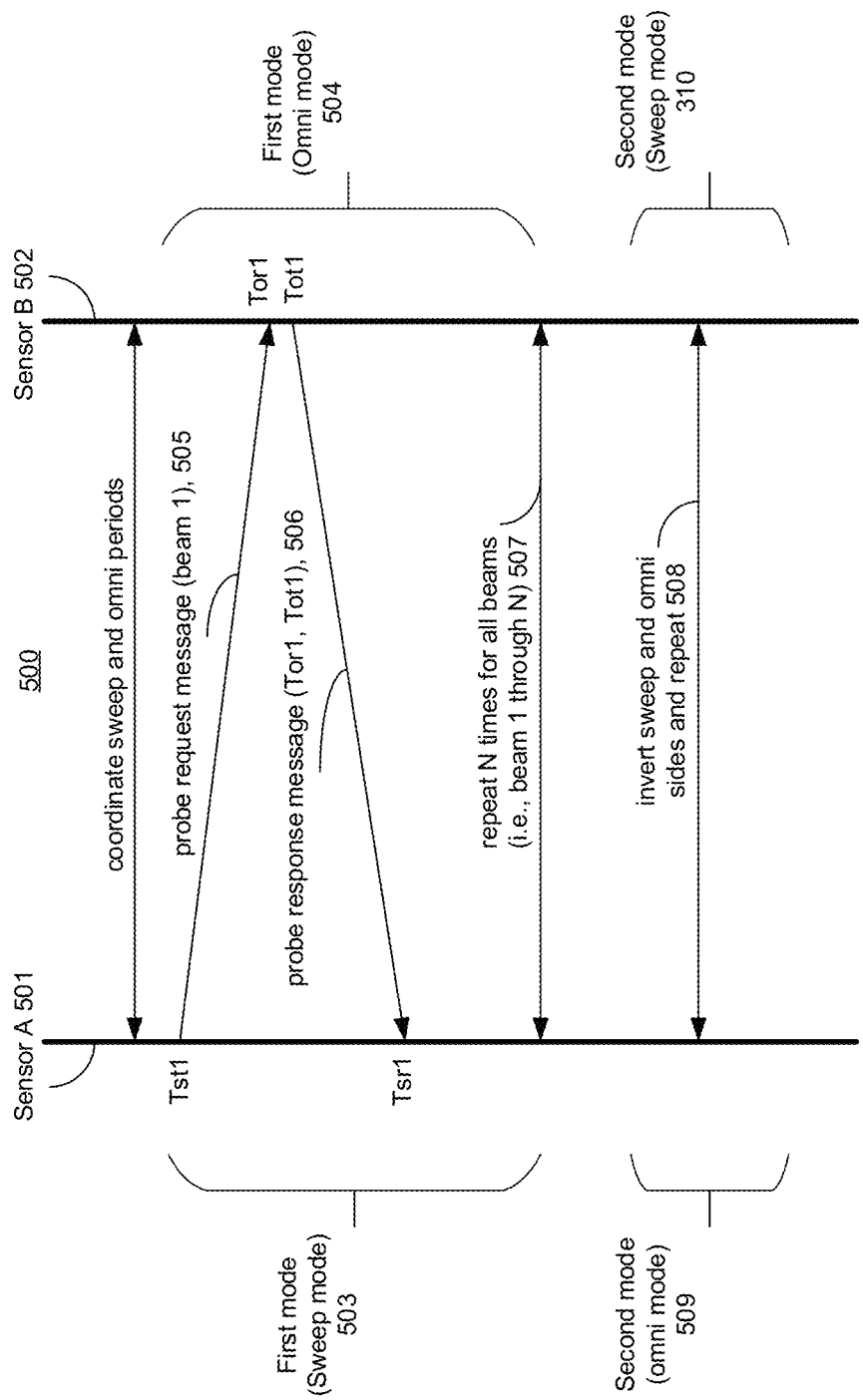
FIG. 5 illustrates a flowchart of a method for measuring distance and orientation between two sensor nodes, in accordance with some embodiments of the disclosure.

FIG. 5 illustrates flowchart 500 of a method for measuring distance and orientation between two sensor nodes, in accordance with some embodiments of the disclosure. It is pointed out that those elements of FIG. 5 having the same reference numbers (or names) as the elements of any other figure can operate or function in any manner similar to that described, but are not limited to such.

Although the blocks in the flowchart with reference to FIG. 5 are shown in a particular order, the order of the actions can be modified. Thus, the illustrated embodiments can be performed in a different order, and some actions/blocks may be performed in parallel. Some of the blocks and/or operations listed in FIG. 5 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Flowchart 500 illustrates the process performed by Sensor A 501 (e.g., apparatus 400) and Sensor B 502 (i.e., the other device) during Sweep and Omni modes. Initially, Sensor A 501 and Sensor B 502 coordinate Sweep and Omni periods with one another. For example, Sensor A 501 and Sensor B 502 allocates a certain period of time for transmission such that during one period Sensor A 501 is in Sweep mode and Sensor B 502 is in Omni mode, and in another period Sensor A 501 is in Omni mode and Sensor B 502 is in Sweep mode.

In some embodiments, when a user having Sensor A 501 is not moving for a time duration (e.g., a threshold duration of 1 minute), then Sensor A 501 can slow down the frequency or increase the period of operating in Sweep and Omni modes. As such, power can be saved.

In some embodiments, sudden movements out of stillness may be tracked by Sensor A 501 relative to Sensor B 502. In some embodiments, a higher layer logic, that understands what state (e.g., in a sports movement) the user is in, can reconfigure the period of operating in Sweep and Omni modes accordingly. For example in the golf example of FIG. 2, when the player is pulling the club back over his head, this can be identified by an application (or higher layer logic) and the period of operating in Sweep and Omni modes may be lowered (i.e., fewer Sweep and Omni modes) by Logic 405. Continuing with the same example, once the club reaches its apex, the period of operating in Sweep and Omni modes is increased (i.e., more Sweep and Omni modes) by Logic 405 since the swing itself is expected to be very rapid and every small nuance in the swing is desired to be monitored.

In some embodiments, when the user having Sensor A 501 is constantly moving (e.g., moving every 1 ms), then Logic 405 of Sensor A 501 can coordinate with Logic 405 of Sensor B 502 to operate Sweep and Omni modes at higher regularities (e.g., constantly).

Here, Sensor A 501 first operates in Sweep Mode 503 (also referred to as the First mode of Sensor A 501) while Sensor B 502 first operates in Omni Mode 504 (also referred to as the First mode of Sensor B 502). In Sweep Mode 503, Sensor A first transmits at time Tst1 a first probe request message 505 (i.e., beam 1) towards Sensor B 502. In some embodiments, Sensor B 502 uses Omni-directional antenna 410 to listen for first probe request message 505. In some embodiments, first probe request message 505 includes encoding of the array direction of Sensor A 501.

At time Tor1, Sensor B 502 receives the first probe request message 505. Sensor B 502 then decodes the encoded first probe request message 505 and transmits a probe response message 506 for Sensor A 501. In some embodiments, first probe response message 506 includes probe request reception time Tor1 and probe response transmission time Tr1. At time Tsr1, Sensor A 501 receives probe response message 506. In some embodiments, probe response message 506 is also encoded and/or encrypted. In some embodiments, Sensor A 501 decodes and/or decrypts the encoded and/or encrypted probe response message.

In some embodiments, Tst1, Tsr1, Tor1, Tot1, receive signal strength, and physical angle are saved in Vector/Table 407. When receiving the probe response message, Sensor A 501 in the sweep period calculates the TOF for the probe messages, and uses this time to calculate the distance traveled by the signal. In some embodiments, Logic 405 computes first TOF (i.e., TOF1) as: (Tsr1−Tsr1)−(Tot1−Tor1). In some embodiments, Sweep mode 503 is repeated 'N' times for all beams of antenna array 401 (i.e., all phase angles 'ω' resulting in all beam steering directions), where 'N' is an integer greater than one. As such, Vector/Table 407 is populated with distance measurements (from TOF information) for various physical angles.

Next, at 508, Sensor A 501 and Sensor B 502 invert Sweep and Omni sides (i.e., exchange their roles) such that Sensor A 501 operates in Omni mode 509 (also referred to as the Second mode of Sensor A 501) and Sensor B 502 operates in Sweep mode (also referred to as the Second mode of Sensor B 502). The process described with reference to processes 503, 504, 505, 506, and 507 are repeated where Sensor A 501 is in Omni mode 409 and Sensor B 502 is in Sweep mode 510.

As such, Vector/Table 407 for Sensor B 502 is populated with times Tst1, Tsr1, Tor1, and Tot1, receive signal strength, phase angle, and distance measurements (from TOF information) for various beam steering directions. After the Sweep and Omni periods finish in both directions, each Sensor builds a vector of signal strength and distance versus relative angle, in accordance with some embodiments.

Figure 6:
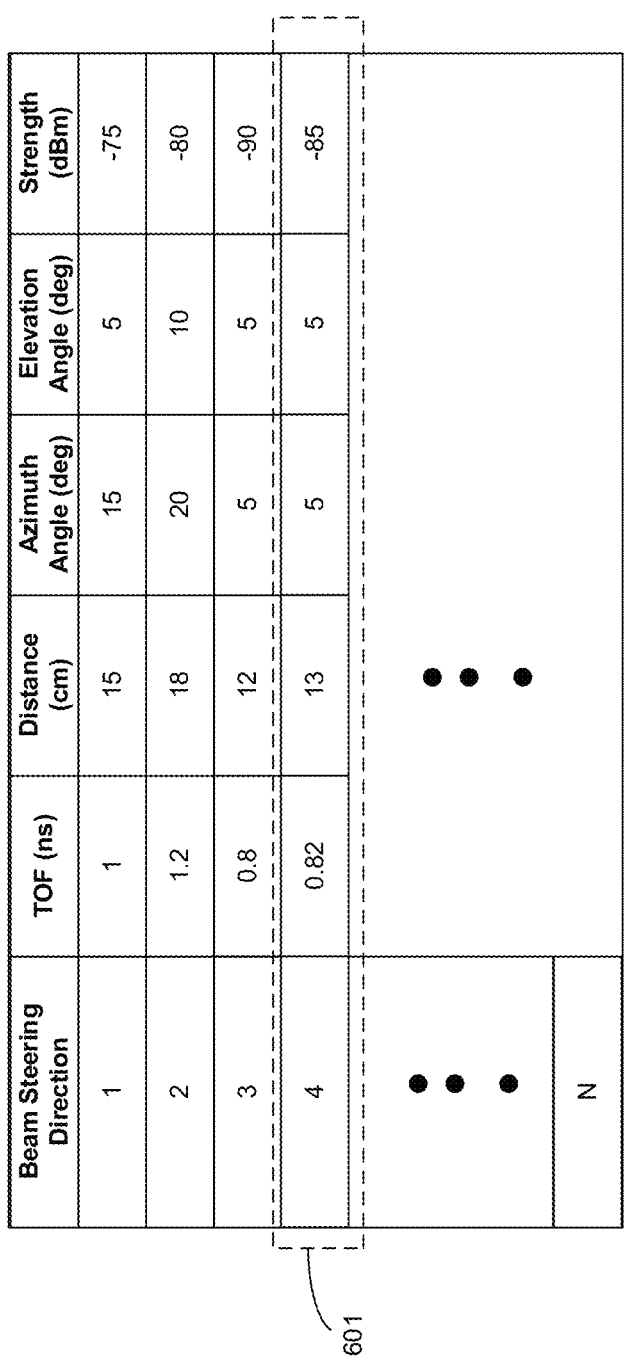
FIG. 6 illustrates a table or a vector of data for various transmission phases (or beam steering directions), in accordance with some embodiments of the disclosure.

FIG. 6 illustrates table (e.g., Vector/Table 407) or vector data 600 for various transmission phases or beam steering directions, in accordance with some embodiments of the disclosure. It is pointed out that those elements of FIG. 6 having the same reference numbers (or names) as the elements of any other figure can operate or function in any manner similar to that described, but are not limited to such. Table 600 shows the data collected, calculated, and measured during Sweep modes. In this example, Table 600 includes data for beam steering directions (e.g., 1, 2, 3, 4 . . . N, where 'N' is an integer), TOF in nanoseconds (ns), calculated distance in centimeters (cm), physical angle(s) in degrees (e.g., azimuth and elevation), and strength of signal in decibels (dBm i.e., decibel-milliwatt). Here, TOF is related to the calculated distance as 2*distance=TOF*c, where 'c' is the speed of light.

Due to signal multipath reflection and diffraction, a probe signal transmitted by another transceiver is likely to be correctly decoded in multiple beam steering directions. To correctly derive the relative angle between the specific transceiver or sensor pair, beam steering directions with longer propagation distances are identified as multipath reflections and therefore not relevant for relative angle and distance determination, in accordance with some embodiments. From the remaining data, for example, the one with the strongest signal strength is determined to represent the accurate relative angle and distance between the transceiver pair.

In this example, even though beam steering direction 3 gives a shorter TOF and distance, its signal strength (−90 dBm) is weaker than the signal strength (−85 dBm) for the case with beam steering direction 4. As such, the tie breaking rule would choose 0.82 over 0.8 on the strength of having higher signal strength and similar distance (i.e., dotted row 601 is selected).

Figure 7:
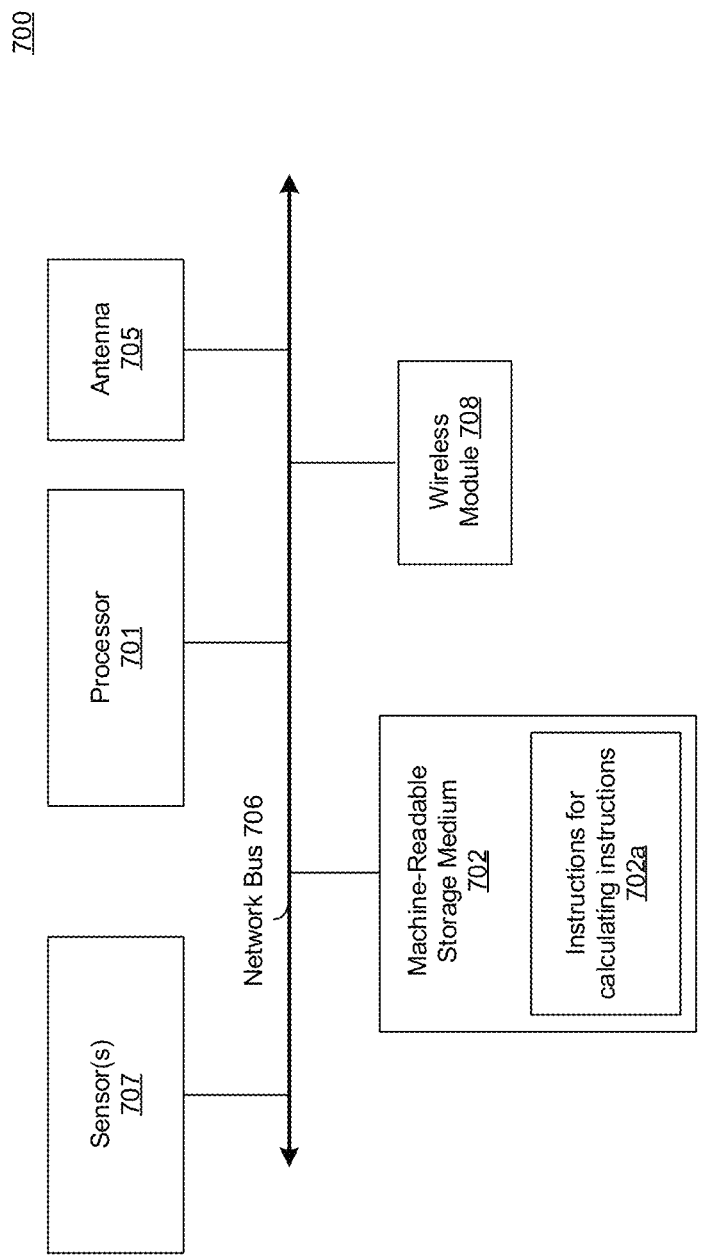
FIG. 7 illustrates a sensor node with machine readable storage medium having instructions to perform high accuracy distance and orientation measurement, according to some embodiments of the disclosure.

FIG. 7 illustrates sensor node 700 with machine readable storage medium having instructions to perform high accuracy distance and orientation measurement, according to some embodiments of the disclosure. It is pointed out that those elements of FIG. 7 having the same reference numbers (or names) as the elements of any other figure can operate or function in any manner similar to that described, but are not limited to such.

In some embodiments, sensor node 700/400 comprises a low power Processor 701 (e.g., a Digital Signal Processor (DSP), an Application Specific Integrated Circuit (ASCI), a general purpose Central Processing Unit (CPU), or a low power logic implementing a simple finite state machine to perform the method of flowchart 500, etc.), Machine-Readable Storage Medium 702 (also referred to as tangible machine readable medium), Antenna 705 (e.g., antenna array 401 and Omni Antenna 410), Network Bus 706, Sensor(s) 707 (e.g., gyroscope, accelerometer, etc.), and Wireless Module 708 (e.g., WiFig compliant logic).

In some embodiments, the various logic blocks of sensor node 700 are coupled together via Network Bus 706. Any suitable protocol may be used to implement Network Bus 706. In some embodiments, Machine-Readable Storage Medium 702 includes Instructions 702a (also referred to as the program software code/instructions) for calculating or measuring distance and relative orientation of a device with reference to another device as described with reference to various embodiments and flowchart.

Program software code/instructions 702a associated with flowchart 500 and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 500 are executed by sensor node 700 (such as shown in FIG. 4).

Referring back to FIG. 7, in some embodiments, the program software code/instructions 702a associated with flowchart 500 are stored in a computer executable storage medium 702 and executed by Processor 701. Here, computer executable storage medium 702 is a tangible machine readable medium that can be used to store program software code/instructions and data that, when executed by a computing device, causes one or more processors (e.g., Processor 701) to perform a method(s) as may be recited in one or more accompanying claims directed to the disclosed subject matter.

The tangible machine readable medium 702 may include storage of the executable software program code/instructions 702a and data in various tangible locations, including for example ROM, volatile RAM, non-volatile memory and/or cache and/or other tangible memory as referenced in the present application. Portions of this program software code/instructions 702a and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions 702a (associated with flowchart 500 and other embodiments) and data can be obtained in their entirety prior to the execution of a respective software program or application by the computing device. Alternatively, portions of the software program code/instructions 702a and data can be obtained dynamically, e.g., just in time, when needed for execution. Alternatively, some combination of these ways of obtaining the software program code/instructions 702a and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 702 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium 702 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 8:
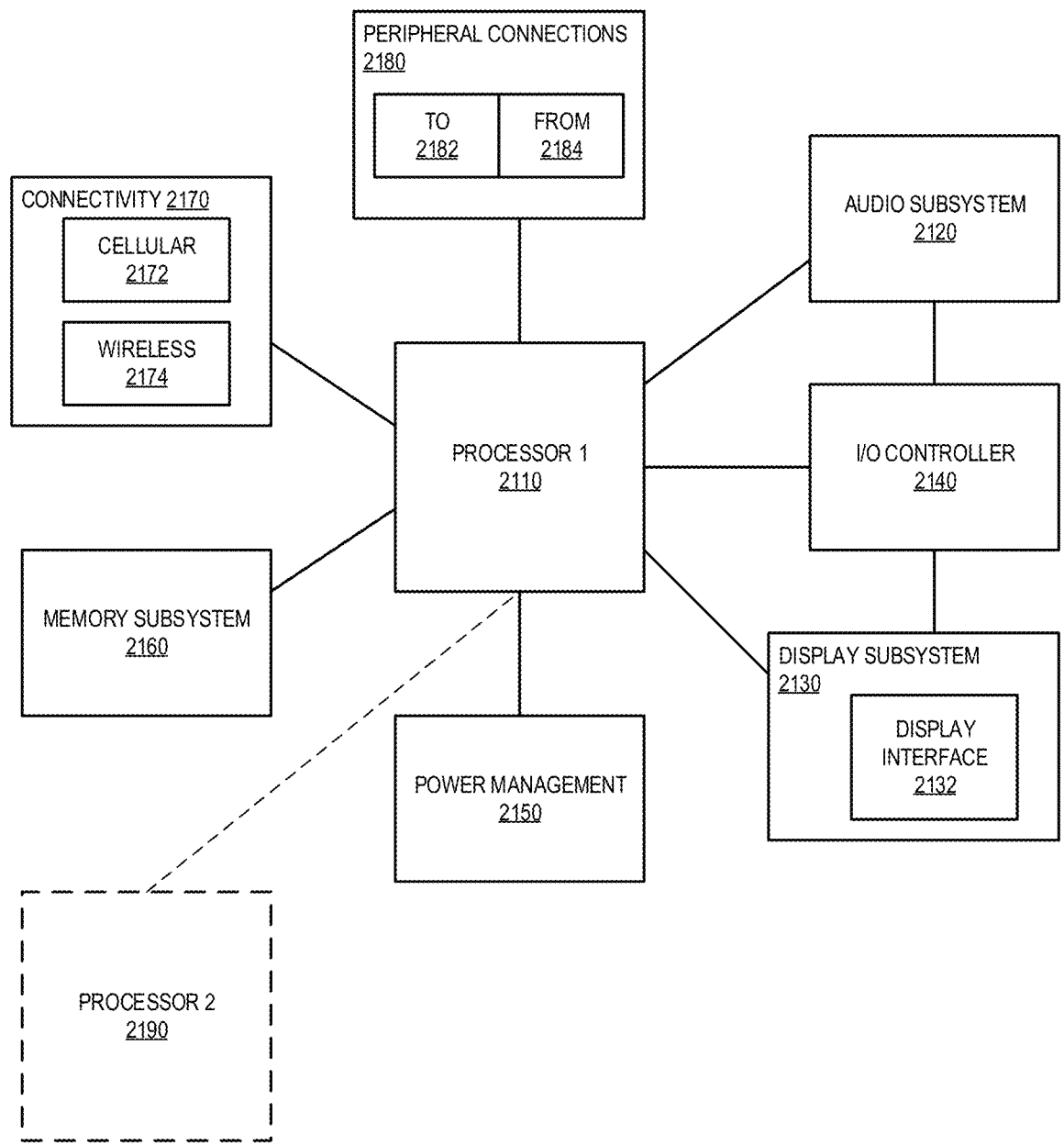
FIG. 8 illustrates a smart device or a computer system or a SoC (System-on-Chip) to analyze data received from one or more sensors having apparatus and/or machine executable instructions for high accuracy distance and orientation measurement, according to some embodiments.

FIG. 8 illustrates a smart device or a computer system or a SoC (System-on-Chip) to analyze data received from one or more sensors having apparatus and/or machine executable instructions for high accuracy distance and orientation measurement, according to some embodiments. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

In some embodiments, computing device 2100 includes a first processor 2110 to analyze data received from one or more sensors having apparatus and/or machine executable instructions for high accuracy distance and orientation measurement, according to some embodiments discussed. In some embodiments, computing device 2100 receives the data stored in Vector/Table 407 and performs various analysis on the data. For example, computing device 2100 can analyze the data collected over a long period of time (e.g., days) and determine historical and statistical analysis of the collected data.

Other blocks of the computing device 2100 may also analyze data received from one or more sensors having apparatus and/or machine executable instructions for high accuracy distance and orientation measurement, according to some embodiments. The various embodiments of the present disclosure may also comprise a network interface within 2170 such as a wireless interface so that a system embodiment may be incorporated into a wireless device, for example, cell phone or personal digital assistant.

In one embodiment, processor 2110 (and/or processor 2190) can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, Peripheral connections 2180 include hardware interfaces and connectors, as well as software components (e.g., drivers, protocol stacks) to make peripheral connections. It will be understood that the computing device 2100 could be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, a machine-readable storage media is provided having instructions stored thereon, that when executed, cause one or more processors to perform an operation comprising: sequentially transmit, in a first mode, at least two first probe request messages in at least two beam steering directions, respectively, towards a device; and receive, from the device, at least two first probe response messages in response to transmitting the at least two first probe request messages. In some embodiments, the machine-readable storage media has further instructions stored thereon, that when executed, cause the one or more processors to perform a further operation comprising: determine time-of-flights (TOFs) for the at least two first probe response messages; and calculate distances traveled by the at least two first probe response messages.

In some embodiments, the machine-readable storage media has further instructions stored thereon, that when executed, cause the one or more processors to perform a further operation comprising: listen, during a second mode, for at least two second probe request messages from the device; and calculate signal strengths of each of the at least two second probe request messages transmitted from the device. In some embodiments, the machine-readable storage media has further instructions stored thereon, that when executed, cause the one or more processors to perform a further operation comprising: generate a vector of signal strengths, distances, and angles for the at least two beam steering directions according to the calculated signal strengths and calculated distances.

In some embodiments, the machine-readable storage media has further instructions stored thereon, that when executed, cause the one or more processors to perform a further operation comprising: discarding, from the vector, data associated with the beam steering directions with longest calculated distances. In some embodiments, the machine-readable storage media has further instructions stored thereon, that when executed, cause the one or more processors to perform a further operation comprising: identify, from the vector, the angle with the strongest signal strength; and determine a distance from the device according to the identified angle. In some embodiments, the machine-readable storage media has further instructions stored thereon, that when executed, cause the one or more processors to perform a further operation comprising: provide the determined distance to a terminal device.

In some embodiments, each of the at least two first and second probe response messages includes: a probe request reception time; and a probe response transmission time. In some embodiments, each of the at least two first probe request messages includes an encoding of a beam steering direction. In some embodiments, the machine-readable storage media has further instructions stored thereon, that when executed, cause the one or more processors to perform a further operation comprising: encode the at least two first probe request messages prior to transmitting.

In another example, an apparatus is provided which comprises: an array of antennas which is operable to sequentially transmit, in a first mode, first probe request messages in a number of beam steering directions to a device, wherein each first probe request message includes an encoding of corresponding beam steering direction from the number of beam steering directions, an Omni-antenna to listen, in a second mode, for a second probe request messages transmitted by the device; a receiver to receive at least two first probe response messages in response to sequentially transmitting the at least two first probe request messages; and logic to generate a vector of signal strengths, distances, and angles for each beam steering direction according to information in the at least two first probe response messages and the first and second probe request messages.

In some embodiments, the apparatus comprises: an encoder to encode the beam steering direction. In some embodiments, the logic is operable to: determine time-of-flights (TOFs) for the at least two first probe response messages; and calculate distances traveled by the at least two first probe response messages. In some embodiments, the apparatus comprises logic to change phase input to the array of antennas to change the beam steering direction. In some embodiments, each of the at least two first and second probe response messages includes: a probe request reception time; and a probe response transmission time. In some embodiments, the first and second probe response messages are Wireless Gigabit Alliance (WiGig) compliant messages.

In another example, a system is provided which comprises: a first sensor; and a second sensor, wherein the second sensor includes: an array of antennas which is operable to sequentially transmit, in a first mode, first probe request messages in each array direction to a device, wherein each of the first probe request messages includes an encoding of a corresponding array direction, an Omni-antenna to listen, in a second mode, for a second probe request messages transmitted by the device; a receiver to receive at least two first probe response messages in response to sequentially transmitting the at least two first probe request messages; and logic to generate a vector of signal strengths, distances, and angles between the second sensor and the device according to information in the at least two first probe response messages and the first and second probe request messages, wherein the array of antennas and Omni-antenna of the first sensor operate in a different frequency channel than array of antennas and Omni-antenna of the second sensor.

In some embodiments, the first sensor includes: an array of antennas which is operable to sequentially transmit, in a first mode, first probe request messages in each array direction to the other device, wherein each of the first probe request messages includes an encoding of a corresponding array direction, and an Omni-antenna to listen, in a second mode, second probe request messages transmitted by the other device; a receiver to receive at least two first probe response messages in response to sequentially transmitting the at least two first probe request messages; and logic to generate the vector of signal strengths, distances, and angles between the first sensor and the other device according to information in the at least two first probe response messages and the first and second probe request messages. In some embodiments, the first and second sensors are configured in a single wearable device. In some embodiments, the first and second sensors operate using Wireless Gigabit Alliance (WiGig) technology.

In another example, a method is provided which comprises: sequentially transmitting, in a first mode, at least two first probe request messages in at least two beam steering directions, respectively, towards a device; and receiving, from the device, at least two first probe response messages in response to transmitting the at least two first probe request messages. In some embodiments, the method comprises: determining time-of-flights (TOFs) for the at least two first probe response messages; and calculating distances traveled by the at least two first probe response messages.

In some embodiments, the method comprises: listening, during a second mode, for at least two second probe request messages from the device; and calculating signal strengths of each of the at least two second probe request messages transmitted from the device. In some embodiments, the method comprises: generating a vector of signal strengths, distances, and angles for the at least two beam steering directions according to the calculated signal strengths and calculated distances. In some embodiments, the method comprises: discarding, from the vector, data associated with the beam steering directions with longest calculated distances. In some embodiments, the method comprises: identifying, from the vector, the angle with the strongest signal strength; and determining a distance from the device according to the identified angle.

In some embodiments, the method comprises: providing the determined distance to a terminal device. In some embodiments, each of the at least two first and second probe response messages includes: a probe request reception time; and a probe response transmission time. In some embodiments, each of the at least two first probe request messages includes an encoding of a beam steering direction. In some embodiments, the method comprises: encoding the at least two first probe request messages prior to transmitting.

In another example, an apparatus is provided which comprises: means for sequentially transmitting, in a first mode, at least two first probe request messages in at least two beam steering directions, respectively, towards a device; and means for receiving, from the device, at least two first probe response messages in response to transmitting the at least two first probe request messages. In some embodiments, the apparatus comprises: means for determining time-of-flights (TOFs) for the at least two first probe response messages; and means for calculating distances traveled by the at least two first probe response messages.

In some embodiments, the apparatus comprises: means for listening, during a second mode, for at least two second probe request messages from the device; and means for calculating signal strengths of each of the at least two second probe request messages transmitted from the device. In some embodiments, the apparatus comprises: means for generating a vector of signal strengths, distances, and angles for the at least two beam steering directions according to the calculated signal strengths and calculated distances.

In some embodiments, the apparatus comprises: means for discarding, from the vector, data associated with the beam steering directions with longest calculated distances. In some embodiments, the apparatus comprises: means for identifying, from the vector, the angle with the strongest signal strength; and means for determining a distance from the device according to the identified angle. In some embodiments, the apparatus comprises: means for providing the determined distance to a terminal device. In some embodiments, each of the at least two first and second probe response messages includes: a probe request reception time; and a probe response transmission time.

In some embodiments, each of the at least two first probe request messages includes an encoding of a beam steering direction. In some embodiments, the apparatus comprises: means for encoding the at least two first probe request messages prior to transmitting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A non-transitory machine-readable storage media having instructions stored thereon, that when executed, cause one or more processors to perform an operation comprising:
sequentially transmit, in a first mode, via a transmitter at least two first probe request messages in at least two beam steering directions, respectively, towards a device;
receive, from the device, via a receiver at least two first probe response messages in response to transmitting the at least two first probe request messages;
determine whether the device is not in motion for a threshold duration; and
slow down a transmission frequency for the transmitter if the device is determined to be not in motion,
wherein the transmitter and the receiver alternate between sweep and omni periods for transmission of the at least two first probe request messages and for reception of the at least first probe responses.

2. The non-transitory machine-readable storage media of claim 1 having further instructions stored thereon, that when executed, cause the one or more processors to perform a further operation comprising:
determine time-of-flights (TOFs) for the at least two first probe response messages; and
calculate distances traveled by the at least two first probe response messages.

3. The non-transitory machine-readable storage media of claim 2 having further instructions stored thereon, that when executed, cause the one or more processors to perform a further operation comprising:
listen, during a second mode, for at least two second probe request messages from the device; and
calculate signal strengths of each of the at least two second probe request messages transmitted from the device.

4. The non-transitory machine-readable storage media of claim 3 having further instructions stored thereon, that when executed, cause the one or more processors to perform a further operation comprising:
generate a vector of signal strengths, distances, and angles for the at least two beam steering directions according to the calculated signal strengths and calculated distances.

5. The non-transitory machine-readable storage media of claim 4 having further instructions stored thereon, that when executed, cause the one or more processors to perform a further operation comprising:
discard, from the vector, data associated with the beam steering directions with longest calculated distances.

6. The non-transitory machine-readable storage media of claim 5 having further instructions stored thereon, that when executed, cause the one or more processors to perform a further operation comprising:
identify, from the vector, the angle with strongest signal strength; and
determine a distance from the device according to the identified angle.

7. The non-transitory machine-readable storage media of claim 6 having further instructions stored thereon, that when executed, cause the one or more processors to perform a further operation comprising:
provide the determined distance to a terminal device.

8. The non-transitory machine-readable storage media of claim 1, wherein the at least two first probe response messages includes:
a probe request reception time; and
a probe response transmission time.

9. The non-transitory machine-readable storage media of claim 1, wherein transmitting each of the at least two first probe request messages includes an encoding of a beam steering direction.

10. The non-transitory machine-readable storage media of claim 1 having further instructions stored thereon, that when executed, cause the one or more processors to perform a further operation comprising:
encode the at least two first probe request messages prior to transmitting.

11. The non-transitory machine-readable storage media of claim 1, wherein the transmission frequency for the transmitter is in a range of 60 GHz.

12. The non-transitory machine-readable storage media of claim 1, wherein the device is approximately 20 cm away from the receiver.

13. The non-transitory machine-readable storage media of claim 1, wherein the device is less than 20 cm away from the receiver, and wherein the receiver includes a Kalman filter.

14. The non-transitory machine-readable storage media of claim 1, wherein the transmitter is to transmit the at least two first probe request messages in sweep mode, and wherein the receiver is to receive the at least first probe response messages in omni mode via an omni antenna.

15. The non-transitory machine-readable storage media of claim 1, wherein the device is a first device, wherein the transmitter is a first transmitter, wherein the receiver is a first receiver, wherein the operation includes:
sequentially transmit, via a second transmitter at least two first second probe request messages in at least two beam steering directions, respectively, towards a second device; and
receive, from the second device, via a second receiver at least two first second probe response messages in response to transmitting the at least two first second probe request messages;
determine whether the second device is not in motion for a threshold duration;
slow down a transmission frequency for the second transmitter if the second device is determined to be not in motion.

16. The non-transitory machine-readable storage media of claim 15, wherein the transmission frequency for the second transmitter is different than the transmission frequency of the first transmitter.

* * * * *